UNITED STATES PATENT OFFICE.

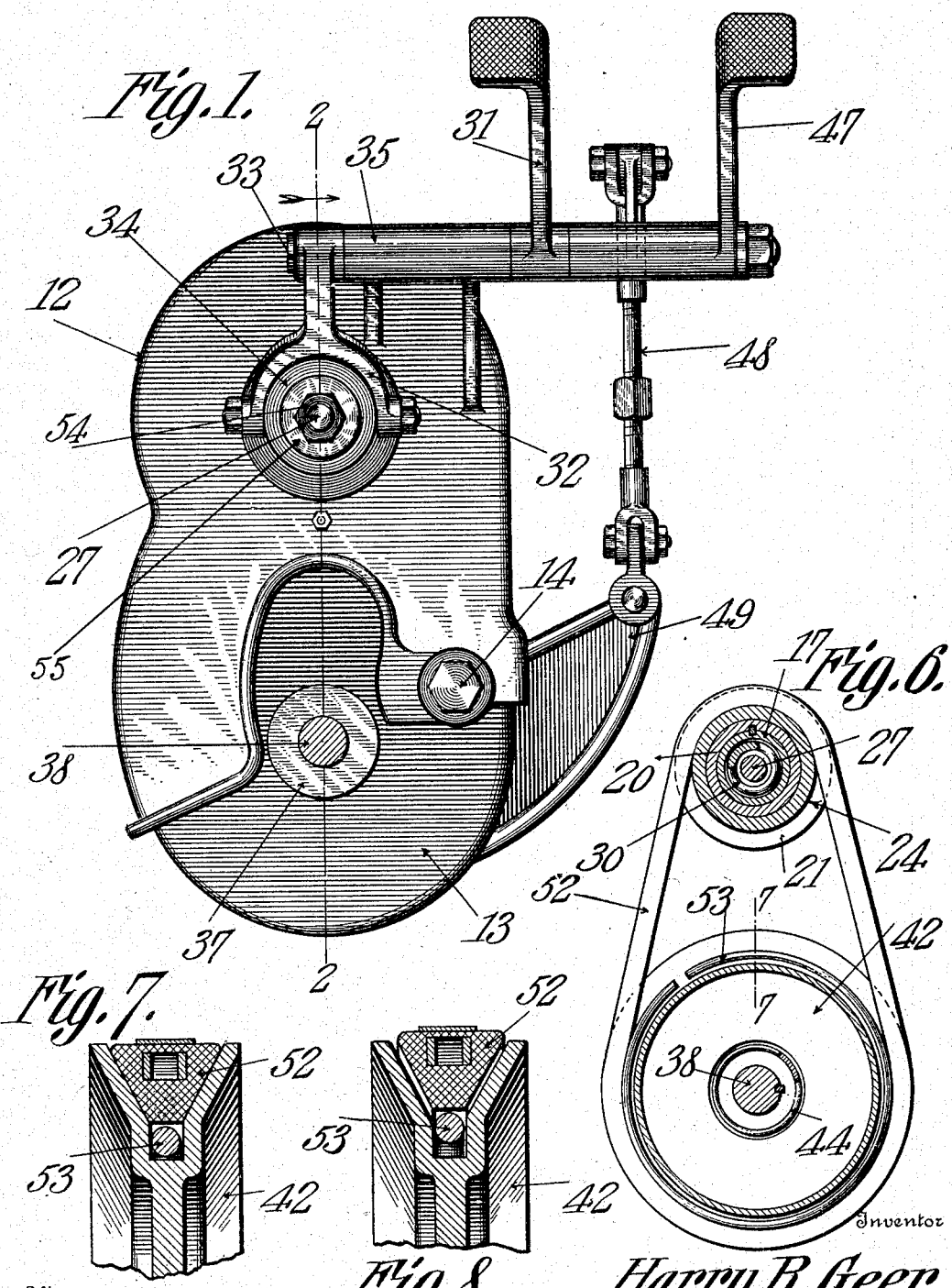

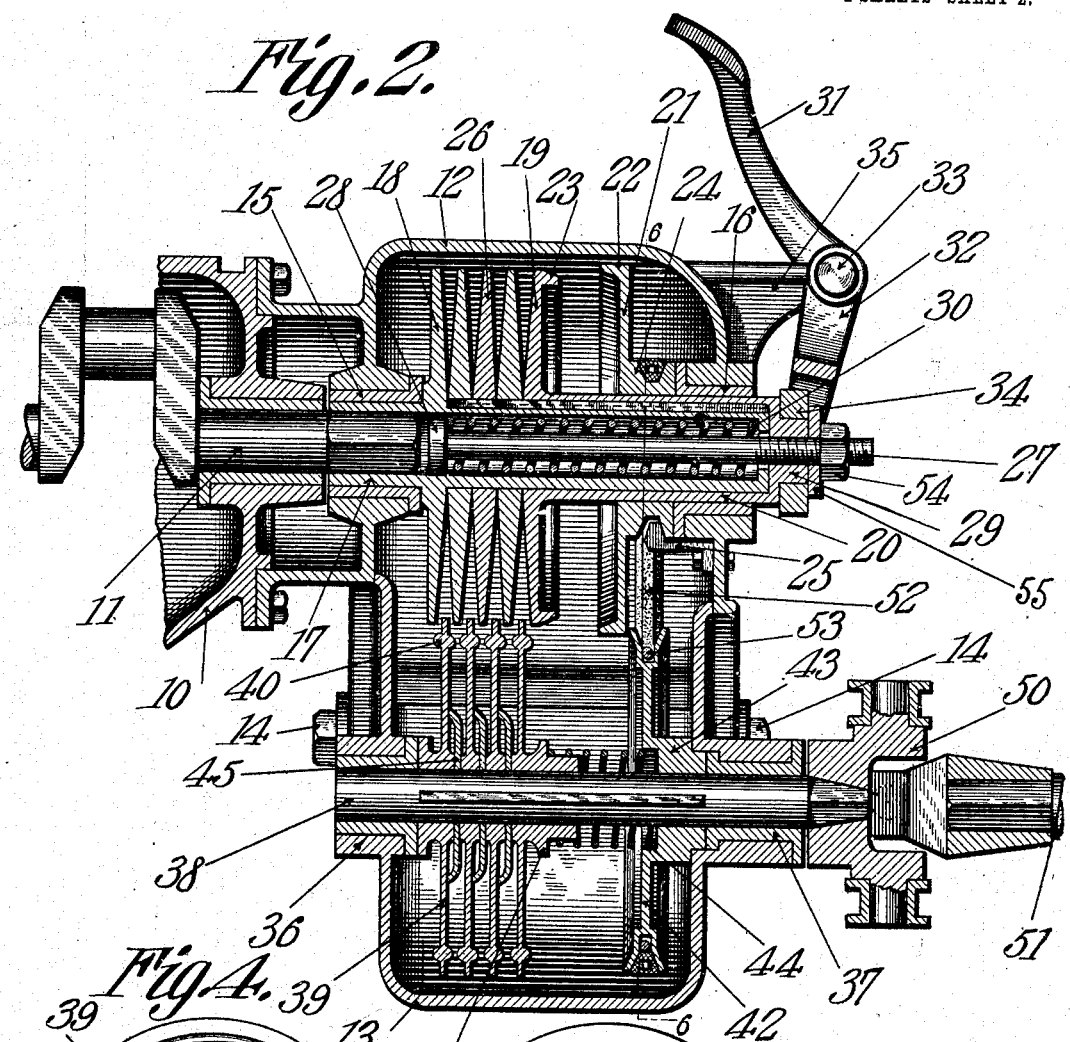
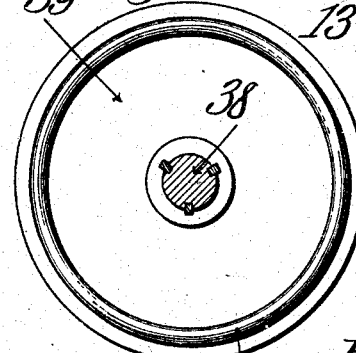
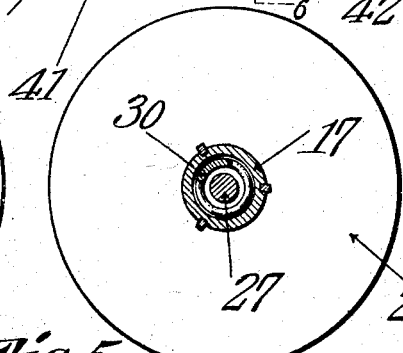
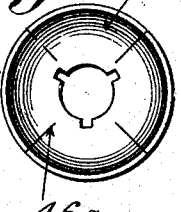

HARRY REED GEER, OF JOHNSTOWN, PENNSYLVANIA, ASSIGNOR OF ONE-HALF TO JOHN D. W. SNOWDEN, OF JOHNSTOWN, PENNSYLVANIA.

VARIABLE-SPEED TRANSMISSION MECHANISM.

948,091.  Specification of Letters Patent.  Patented Feb. 1, 1910.

Application filed June 19, 1909. Serial No. 503,192.

*To all whom it may concern:*

Be it known that I, HARRY REED GEER, a citizen of the United States, residing at Johnstown, in the county of Cambria and State of Pennsylvania, have invented a new and useful Variable - Speed Transmission Mechanism, of which the following is a specification.

This invention relates to a variable speed transmission mechanism designed more particularly for motor vehicles, although not limited thereto, and its object is to provide an improved friction drive having a wide speed variation, which is entirely foot controlled, thus leaving the operator's hands free for steering and engine control.

Another object of the invention is to provide a mechanism of the kind stated by which the change from one speed to another is made smoothly and without jerks, and also to provide a reversing mechanism which offers no frictional resistance when not in use.

These and other objects and advantages are obtained by a novel construction and arrangement of parts hereinafter described and claimed, reference being had to the drawings hereto annexed in which—

Figure 1 is an end view of the mechanism. Fig. 2 is a vertical section on the line 2—2 of Fig. 1. Fig. 3 is an elevation of one of the springs employed for holding one set of friction disks in proper position. Fig. 4 is a section taken through the driven shaft showing one of the driven friction disks thereon. Fig. 5 is a similar section taken through the drive shaft and showing one of the drive friction disks thereon. Fig. 6 is a section on the line 6—6 of Fig. 2. Fig. 7 is a section on the line 7—7 of Fig. 6. Fig. 8 is a view similar to the preceding showing the parts in another position.

Referring to the drawings, 10 denotes a portion of the engine base having a bearing for the crank shaft 11. The speed transmission mechanism to be hereinafter described is inclosed in a suitable casing comprising a stationary portion 12 which is bolted or otherwise rigidly secured to the engine base, and a movable portion 13 hinged to said stationary portion at 14. The two portions of the casing overlap, whereby a dust-proof inclosure for the mechanism mounted therein is had.

In the end walls of the portion 12 of the casing are bearings 15 and 16 respectively. In the bearing 15 is supported a tubular shaft 17 which is in axial alinement with the crank or drive shaft 11. The latter shaft extends at one end into the bore of the shaft 17, said end and the bore being squared so that the two shafts will rotate together. Any other suitable coupling means between the shafts may be provided.

Formed integral with, or rigidly secured on the shaft 17, perpendicular to its axis, is a disk 18 which abuts on one side against the bearing 15. On said shaft is also splined a friction clutch member comprising a disk 19 having an elongated hub 20 which is supported in the bearing 16. On the hub runs loosely the other clutch member, said member comprising a disk 21 having a pan rim 22 adapted to be engaged by the conical rim 23 of the member 19. Formed integral with, or rigidly secured to the disk 21 is a grooved pulley 24 which abuts against the bearing 16, and is held thereagainst by a finger 25 bolted to the portion 12 of the casing, and extending into the groove of the pulley. Inasmuch as the disk 19 is splined in the shaft 17, the rotation of the latter will be imparted to the pulley 24 when the parts 22 and 23 are in frictional engagement with each other.

On the shaft 17, between the disks 18 and 19, are mounted disks 26 which extend perpendicular to the axis of said shaft, and are splined thereon. Said disks 26 are tapered, gradually decreasing in thickness from their centers toward their peripheries, and the faces of the disks 18 and 19 are correspondingly inclined so that tapered spaces are formed between said disks 18, 26 and 19, the taper being in the direction of the axis of the shaft 17.

In the bore of the shaft 17 is mounted a stem 27 having at its inner end a head 28. The opposite end of the stem screws into the outer end of the hub 20, said end of the hub having a reduced portion 29 extending outside of the casing 12, and provided with a screw-threaded opening to receive the stem. The bore of the hub has a shoulder which abuts against one end of the shaft 17, said end of the shaft being closed with the exception of an opening through which the stem loosely passes. Between this end of the shaft, and the head 28, a spring 30 is coiled around the stem 27, said spring serving to back up the hub 20, and yieldingly press the disks 18, 26 and 19 together. The spring load is removed from the disks by a foot lever 31 operating through a forked lever 32 mounted on a rock shaft 33, and engageable with a trunnion ring 34 mounted on the hub 20. On the portion 12 of the casing is a bracket 35 which supports the shaft 33.

The end walls of the portion 13 of the casing have bearings 36 and 37 respectively in which the driven shaft 38 is mounted. On this shaft is splined a series of disks 39 having adjacent to their peripheries concentric ribs 40. These ribs are located on both faces of the disks, and they are all spaced the same distance from the centers of the disks.

The disks 39 are so positioned on the shaft 38, that they may enter the spaces between the disks on the drive shaft when the driven shaft is swung in that direction. The disks on the driven shaft have hubs of sufficient length to hold them perpendicular to the axis of said shaft, and the hub of the disk at one end of the series abuts against the bearing 36. The disk at the other end of the series has an elongated hub to prevent binding on the shaft by side pressure against the disk. On this hub is a shoulder 41 which is for a purpose to be presently described. On the driven shaft 38 is also mounted a grooved pulley 42 having a hub 43, one end of which abuts against the bearing 37. This pulley is in line with the pulley 24, and is keyed on the shaft 38. In the other end of the hub 43 is a recess in which seats a spring 44 which is coiled around the shaft 36, and bears at its other end against the shoulder 41.

Between the disks 39 are mounted light springs 45 which are for the purpose of assisting the sliding movement of said disks on the shaft 38 when they are wedged apart by the disks on the drive shaft as will be presently described. The spring 44 is of sufficient strength to compress the springs 45, and thus keeps the disks 39 in alinement with the spaces between the disks on the drive shaft. The springs 45 are cup-shaped disks which are keyed on the shaft 38, and located between the hubs of the disks 39. One of these spring disks is provided for each disk 39 except the one having its hub pressed by the spring 44. The spring disks are slitted radially as indicated at 46, said slits extending inwardly from the peripheries a suitable distance, whereby spring tongues are formed which press at their free ends against the faces of the disks 39.

The portion 13 of the casing is swung on its pivot 14 by a foot lever 47 through a connecting rod 48. One end of the latter is connected to the foot lever, and the other end to a bracket arm 49 on said part 13 of the casing. The shaft 38 is connected by a universal joint 50 to a shaft section 51 connected to the parts to be driven. This joint is provided in order that the portion 13 of the casing may be swung as stated, the shaft 38 swinging therewith. The pulleys 24 and 42 are connected by a belt or chain 52. In the groove of the pulley 42 is mounted a split spring ring 53 having a normal tendency to spread, the purpose of which will be presently described.

In use, variable forward movement is had by swinging the portion 13 of the casing with the shaft 38, and the disks thereon in the direction of the disks on the drive shaft, between the latter a greater or less distance from the center of the drive shaft, according to the speed desired, the speed decreasing as the disks on the driven shaft approach the center of the drive shaft. Reversal is accomplished by disengaging the disks, and bringing the clutch disks 19 and 21 together, which is done by the foot lever 31, pressure thereon, through the forked lever 32 sliding the disk 19 into locking engagement with the disk 21. When the shaft 38 and its disks are swung in the direction of the drive shaft, the distance between said shafts is shortened, and the belt 52 becomes slack. This slack is taken up by the ring 53 which expands, and thus prevents the belt from slipping out of the groove of the pulley 42. In this position, the belt lies loosely in the groove of the pulley 42 as shown in Fig. 8. When the driven shaft is swung away from the drive shaft, the belt is again tightened which constricts the ring, and the belt then properly engages the groove of the pulley 42 in order to impart motion thereto when the clutch disks 19 and 21 are properly connected. This constriction of the ring is effected by the tightening of the belt, and when the shaft 38 is again swung in the direction of the drive shaft, the ring expands and automatically disengages the belt from the pulley 42. The reversing mechanism therefore offers no frictional resistance when not in use. Both series of disks are movable endwise on their shafts, and the springs 45 assist the driven disks in their endwise sliding movement when they are wedged apart by the drive disks, the latter also spreading in order that the driven disks may enter therebetween the required distance to obtain the desired speed. The spring 44 is of sufficient strength to compress the springs 45, and thus aline the driven disks when they are out of engagement with the drive disks. The disks 43 are solely for automatically lining the driven disks as stated, and not to add to the driving efficiency. The spreading movement of the drive disks is opposed by the spring 30, and as the stem 27 around which the spring is coiled extends to the outside of the hub, it is easily accessible for the purpose of adjusting the tension of the spring. This adjustment is effected by means of a nut 54 screwed on the outer end of the stem. Between the nut and the outer end of the reduced portion 29 of the hub 20 is interposed a washer 55, which also serves to hold the trunnion ring 34 in place.

The mechanism herein described provides a transmission device having a wide speed variation, without employing toothed gears which precludes the possibility of stripping of teeth or clutch jaws, as well as annoying jerks when speed changes are made. The change from one speed to another is gradual and smooth, and by the ribs 40 an increased efficiency in the friction drive is had.

If desired, the reversing mechanism may be dispensed with, and it may also be desirable, for road clearance, to mount the drive and driven shaft vertically instead of horizontally as shown in the drawings. Various other changes and modifications may also be resorted to without a departure from the invention.

What is claimed is:

1. In a variable speed mechanism, a pair of shafts, a support for one of said shafts whereby it may be swung toward and from the other shaft, a series of disks mounted on each shaft to turn therewith, the disks of one series being adapted to enter between the disks of the other series and to frictionally engage the same, and means for alining the disks when they are out of engagement.

2. In a variable speed mechanism, a pair of shafts, a support for one of said shafts whereby it may be swung toward and from the other shaft, a series of disks mounted on each shaft to turn therewith, the disks of one series being adapted to enter between the disks of the other series, and to frictionally engage the same, the disks of one series having an endwise movement on their shaft when brought into engagement with the disks of the other series, and yielding means opposing said endwise movement.

3. In a variable speed mechanism, a pair of shafts, a support for one of said shafts whereby it may be swung toward and from the other shaft, a series of disks mounted on each shaft to turn therewith, the disks of one series being adapted to enter between the disks of the other series, and to frictionally engage the same, and the disks of one series having an endwise movement on their shaft when brought into engagement with the disks of the other series, yielding means engageable with the endwise movable disks to assist said endwise movement in one direction, and a yielding means opposing said endwise movement.

4. In a variable speed mechanism, a pair of shafts, a support for one of said shafts whereby it may be swung toward and from the other shaft, a series of disks mounted on each shaft to turn therewith, the disks of one series being adapted to enter the disks of the other series, and to frictionally engage the same, and the disks of one series being hubbed to space their faces apart, and having an endwise movement on their shaft when brought into engagement with the disks of the other series, and yielding means opposing said endwise movement.

5. In a variable speed mechanism, a pair of shafts, a support for one of said shafts whereby it may be swung toward and from the other shaft, a series of disks mounted on each shaft to turn therewith, the disks of one series being adapted to enter between the disks of the other series and to frictionally engage the same, and the disks of one series being hubbed to space their faces apart, and having an endwise movement on their shaft when brought into engagement with the disks of the other series, springs clamped between the hubbed disks, said springs engaging the faces of said disks, and serving to assist their endwise movement in one direction, and a yielding means opposing the endwise movement in said direction.

6. In a variable speed mechanism, a pair of shafts, a support for one of said shafts whereby it may be swung toward and from the other shaft, a series of disks mounted on each shaft to turn therewith, the disks of one series being adapted to enter between the disks of the other series, and to frictionally engage the same, and the disks of one series being hubbed to space their faces apart, and having an endwise movement on their shaft when brought into engagement with the disks of the other series, cupped disks between the hubbed disks, and having spring tongues engageable with the faces of said hubbed disks, said spring tongues tending to assist the endwise movement of the disks in one direction, and yielding means opposing said endwise movement.

7. In a variable speed mechanism, a pair of shafts, a support for one of said shafts whereby it may be swung toward and from the other shaft, a series of disks mounted on each shaft to turn therewith, the disks of one series being adapted to enter between the disks of the other series and to frictionally engage the same, the disks of the respective series having an endwise movement on their shafts when brought into engagement with each other, and yielding means opposing said endwise movement.

8. In a variable speed mechanism, a pair of shafts, a support for one of said shafts whereby it may be swung toward and from the other shaft, a series of disks mounted on each shaft to turn therewith, the disks of the respective series being normally in alinement, and being movable endwise on their shafts, and the disks of one series being adapted to enter between the disks of the other series and to frictionally engage the same, and yielding means opposing the endwise movement of the disks, and returning them to their normal position when disengaged.

9. In a variable speed mechanism, a pair of shafts, a support for one of said shafts whereby it may be swung toward and from the other shaft, one of said shafts being tubular, a series of disks mounted on each shaft to turn therewith, the disks of one series being adapted to enter between the disks of the other series, and to frictionally engage the same, one of the disks of the tubular shaft being fixed thereto, and the other disks of said shaft having an endwise movement, a spring confined in the tubular shaft, and a stem mounted in the shaft and engageable by the spring, said stem being connected to the outer one of the endwise movable disks, and said spring tending to press the said disks in the direction of the fixed disk.

10. In a variable speed mechanism, a pair of shafts, a support for one of said shafts whereby it may be swung toward or from the other shaft, a series of disks mounted on each shaft to turn therewith, the disks of one series being adapted to enter between the disks of the other series and to frictionally engage the same, one of the disks of one series being fixed to its shaft, and the remainder of said series being movable endwise, and yielding means for pressing the said movable disks in the direction of the fixed disk.

11. In a variable speed mechanism, a pair of shafts, a support for one of said shafts whereby it may be swung toward and from the other shaft, a series of disks mounted on each shaft to turn therewith, the disks of one series being adapted to enter between the disks of the other series, and to frictionally engage the same, the disk at the end of one of the series being fixed to its shaft, and the disk at the opposite end of said series having an endwise movement on said shaft and being provided with an elongated hub, and the intermediate disks of said series being also movable on the shaft, and yielding means connected to said elongated hub for pressing the movable disks against the fixed disk.

12. In a variable speed mechanism, a pair of shafts, a casing having bearings in which one of the shafts is supported, and said casing having a hinged overlapping portion provided with bearings in which the other shaft is supported, said shaft being movable toward and from the other shaft by the swing of the hinged portion of the casing, and variable speed mechanism carried by the shafts and actuated by the swinging of the last mentioned shaft in the direction of the other shaft.

13. In a variable speed mechanism, a pair of shafts, a support for one of said shafts whereby it may be swung toward and from the other shaft, a series of disks mounted on each shaft to turn therewith, the disks of one series having concentric ribs on their faces, and adapted to enter between the disks of the other series, the disks of the last mentioned series decreasing in thickness in the direction of their peripheries.

In testimony that I claim the foregoing as my own, I have hereto affixed my signature in the presence of two witnesses.

HARRY REED GEER.

Witnesses:
H. B. MAINHART,
C. E. JENKINS.